(12) United States Patent
Fargo et al.

(10) Patent No.: US 8,492,943 B2
(45) Date of Patent: Jul. 23, 2013

(54) PROTECTOR MOUNTING APPARATUS FOR PROTECTOR MOUNTED ADJACENT THE WINDINGS OF A MOTOR

(75) Inventors: Vincent P. Fargo, St. Charles, MO (US); J. Scott Rose, Alton, IL (US); Donald R. Shaw, Fenton, MO (US); Dick Cao, JiangSu Province (CN); Xilai Yang, JiangSu Province (CN); Cedar Liu, JiangSu Province (CN)

(73) Assignee: Emerson Electric Co., St. Louis, MO (US)

( * ) Notice: Subject to any disclaimer, the term of this patent is extended or adjusted under 35 U.S.C. 154(b) by 1433 days.

(21) Appl. No.: 11/554,907

(22) Filed: Oct. 31, 2006

(65) Prior Publication Data

US 2008/0100184 A1    May 1, 2008

(51) Int. Cl.
*H01H 61/00* (2006.01)

(52) U.S. Cl.
USPC .......................................... 310/68 C; 337/14

(58) Field of Classification Search
USPC .......................................... 310/68 C; 337/14
See application file for complete search history.

(56) References Cited

U.S. PATENT DOCUMENTS

| | | | |
|---|---|---|---|
| 2,909,719 A | 10/1959 | Dubberley | |
| 3,131,322 A * | 4/1964 | Pleiss, Jr. et al. | 337/380 |
| 3,200,274 A | 8/1965 | Munier | |
| 3,319,096 A | 5/1967 | Eberhart et al. | |
| 3,875,439 A | 4/1975 | Roach | |
| 4,061,935 A * | 12/1977 | Kandpal | 310/68 C |
| 4,181,393 A | 1/1980 | Lill | |
| 4,188,553 A | 2/1980 | Wheaton | |
| 4,236,092 A | 11/1980 | DiFlora | |
| 4,313,069 A | 1/1982 | Szabo et al. | |
| 4,328,438 A | 5/1982 | Zolman | |
| 4,376,926 A | 3/1983 | Senor | |
| 4,454,493 A | 6/1984 | Ubukata et al. | |
| 4,458,231 A | 7/1984 | Senor | |
| 4,476,452 A | 10/1984 | D'Entremont | |
| 4,656,378 A * | 4/1987 | Atherton et al. | 310/71 |
| 4,734,602 A * | 3/1988 | Hauser et al. | 310/68 C |
| 4,866,408 A | 9/1989 | Petraitis et al. | |
| 4,890,025 A | 12/1989 | Hadeler et al. | |
| 4,914,329 A | 4/1990 | Ottersbach | |
| 4,924,350 A | 5/1990 | Reddy et al. | |
| 5,367,282 A | 11/1994 | Clem | |
| 5,684,347 A * | 11/1997 | Vogt et al. | 310/68 C |
| 5,723,922 A * | 3/1998 | Fowlkes | 310/68 C |
| 6,005,471 A | 12/1999 | Higashikata et al. | |
| 6,223,416 B1 * | 5/2001 | Boyd et al. | 29/596 |
| 6,244,837 B1 * | 6/2001 | Williams et al. | 417/423.7 |
| 6,433,975 B1 | 8/2002 | Satoh et al. | |
| 6,498,560 B2 | 12/2002 | White et al. | |
| 6,674,620 B2 | 1/2004 | Lamborghini et al. | |
| 6,801,116 B2 | 10/2004 | Oh et al. | |
| 2004/0114286 A1 | 6/2004 | Sullivan et al. | |

* cited by examiner

OTHER PUBLICATIONS

Texas Instruments, 3MP Self-Hold Motor Protector/Thermal Cut-Out Product Bulletin, Sep. 2002, 2 pages.

*Primary Examiner* — Tulsidas C Patel
*Assistant Examiner* — Naishadh Desai
(74) *Attorney, Agent, or Firm* — Harness, Dickey & Pierce, P.L.C.

(57) ABSTRACT

A motor includes a stator core and windings extending through the stator core. The windings include end turns extending from the stator core that form a coil. A protector is electrically connected to the windings and is positioned adjacent the coil. A bracket is sized and shaped to receive the protector, and includes a spacer in contact with the protector and with the coil. The protector is spaced from the coil by the spacer to reduce heat transfer from the windings to the protector.

19 Claims, 6 Drawing Sheets

PROTECTOR MOUNTING APPARATUS FOR PROTECTOR MOUNTED ADJACENT THE WINDINGS OF A MOTOR

FIELD OF THE INVENTION

This invention relates to a motor having a thermal and/or current sensing protector for protecting the motor from damage, and more particularly to apparatus for attaching such a protector adjacent the windings of the motor.

BACKGROUND OF THE INVENTION

An electric motor often includes a protector capable of shutting down the motor before it is damaged due to an abnormality such as excessive heat. A typical protector is electrically connected to the winding and is adapted to break the current through the winding when the protector senses excessive temperature and/or current in the winding.

Protectors may be "on-winding" protectors, which are mounted directly on the windings, or "off-winding" protectors, which are mounted in a position remote from the windings. It is often beneficial to use on-winding protectors so that the thermal sensor is more responsive to changes in temperature in the windings. By measuring the temperature at the windings, e.g., without a significant gap between the windings and the sensor, the protector can respond more quickly to break current when the windings overheat.

In some cases, however, mounting the protector directly on the windings may make the sensor over-sensitive to changes in temperature in the windings. Moreover, while the properties of the protector may be changed to try to make the sensor less sensitive, applicants have discovered cases where no protector is suitable due to the proximity of the protector to the windings. In some applications, the protector will "open" or "trip" prematurely so that, for example, the motor will fail the Underwriters Laboratory Maximum Carry Current (ULMCC) test. While "off-winding" protectors or sensor/controller arrangements may be used, applicants have found these are not always a satisfactory, cost-effective solution.

SUMMARY OF THE INVENTION

In one aspect of the invention, a motor includes a stator core and windings extending through the stator core. The windings include end turns that extend from the stator core and form a coil. A protector is electrically connected to the windings and is positioned adjacent the coil. A bracket is sized and shaped to receive the protector, and includes a spacer in contact with the protector and with the coil. The protector is spaced from the coil by the spacer to reduce heat transfer from the windings to the protector.

In another aspect, the bracket includes a pocket receiving the protector and a spacer in contact with the coil.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

BRIEF DESCRIPTION OF THE DRAWINGS

Corresponding reference characters indicate corresponding parts throughout the drawings.

DETAILED DESCRIPTION OF THE DRAWINGS

Figure 1:
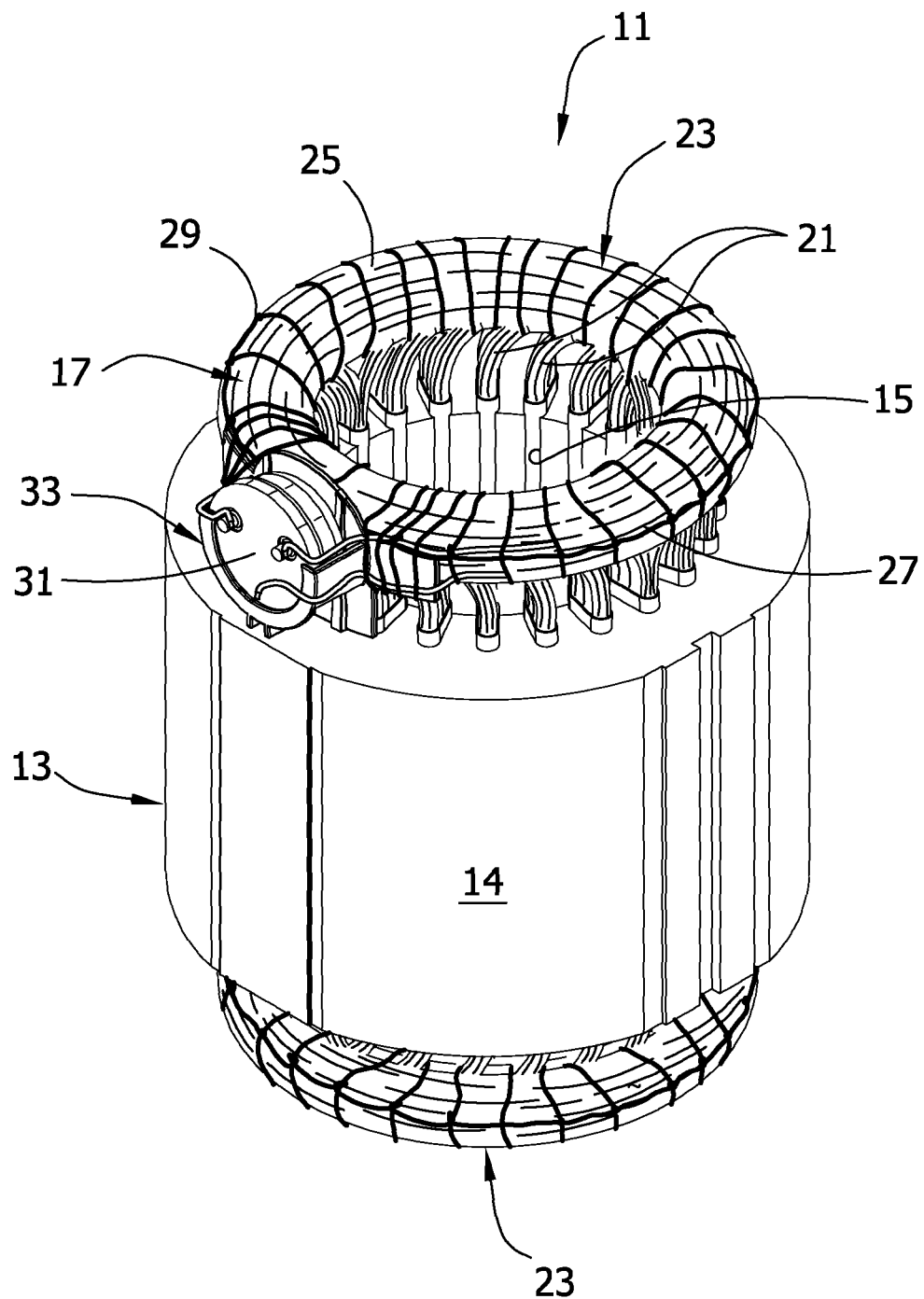
FIG. 1 is a front perspective of a portion of a motor of one embodiment.

Referring to FIG. 1, a motor of one embodiment of the invention is generally designated 11. The motor generally includes a stator 13 including stator core 14 having slots 15, and windings 17 having wire extending through the slots. The windings 17 include end turns 21 extending from the slots 15. The end turns 21 form a coil generally designated 23 on each side of the stator core 14. Each coil 23 has a top or axial end 25 and a radially facing side 27. It is understood that orientation terms such as "top" and the like used herein refer only to the orientation as depicted in the drawings and are not meant to be limiting in any way. A fastening system generally designated 29, which may include lacing, cable ties, straps, or any combination thereof, is used to hold the coil together. The fastening system 29 of this embodiment includes lacing extending over each coil 23 and between the winding wire 19 extending from the slots 15. For clarity, the rotor and housing are omitted and it will be understood that many different types of rotors and housings are suitable for use with this invention. More generally, it should be understood that a variety of motor configurations can be used within the scope of this invention.

Referring now to FIGS. 1-4, the motor includes a protector 31 and bracket generally designated 33 mounted adjacent the coil 23 of the windings 17. The protector 31 is electrically connected to the windings 17. As shown, the protector 31 is mounted on the outward side 27 of the coils 23, but may be mounted elsewhere on the coil or windings.

The bracket 33 is generally sized and shaped to receive the protector 31, and spaces the protector from the coil 23 of the windings 17 to reduce heat transfer from the windings to the protector. More particularly, and with reference to FIGS. 3-6, the bracket 33 of this embodiment includes a spacer 41 having an inwardly facing or back surface 43 mounted against the coils 23, and a front surface 45 in contact with, or adjacent, the protector 31. The back surface 43 is curved to conform to the curvature of the coil 23. The front surface 45 of the spacer 41 optionally includes ribs 47 extending therefrom and in contact with the protector 31. The ribs 47 serve to further space the protector 31 from the windings 17, to allow gas to flow between the protector and the front surface 45. This gas may help to cool the protector 31. Note the ribs 47 may taper both in height and in width as shown, the taper helping to retain the protector 31 as described below.

The spacer 41 of this embodiment has a thickness of between about 0.07 and about 0.20 inches, or more particularly between about 0.08 and about 0.10 inches (excluding the thickness of the ribs). However, the thickness can be increased above 0.20 in other applications to make the protector 31 less sensitive to the temperature of the windings 17.

Arms 51 extend from the front surface 45 of the spacer 41, the arms being spaced apart to promote passage of gas between the arms and thereby promote cooling of the protector 31. As viewed in FIGS. 2 and 5, the arms 51 are generally disposed at the three, six and nine o'clock positions. The arms 51 have a generally arcuate shape to conform to the shape of the protector 31, and each extends along an arc of, for example, 10-20 degrees. Many other configurations are contemplated within the scope of the invention.

In this embodiment, an arcuate flange or retainer 55 is disposed at distal ends of the arms 51. The retainer 55 extends continuously over an arc of more than 180 degrees, e.g., about 212 degrees. The arms 51 have a height somewhat greater than the height of the protector 31 so that the retainer 55 extends over an outer surface of the protector. Thus, the protector 31 is captured in the pocket formed by the retainer 55, the arms 51 and the front surface 45 of the spacer 41. Note that the tapering of the ribs 47 may also aid in forming a snug fit of the protector 31 in the bracket 33. Many other configurations of the pocket and other retaining or capturing means for the protector 31 are contemplated within the scope of the invention. For example, the arcuate retainer may be omitted, and the arms may include detents or "snaps" that fit over the protector.

Figure 2:
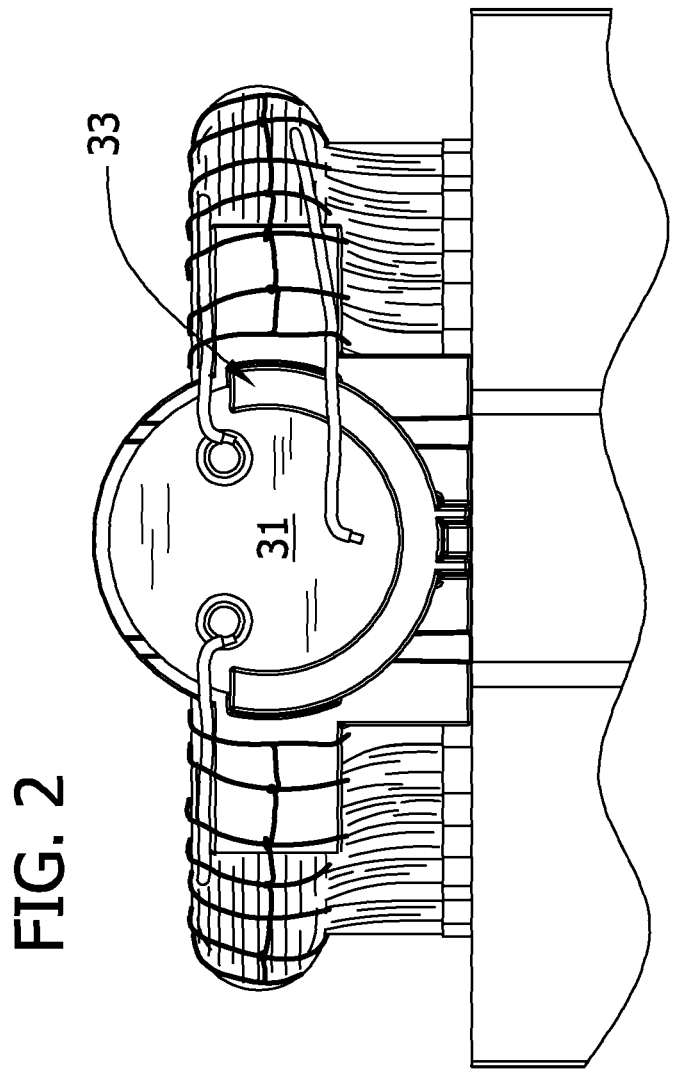
FIG. 2 is an enlarged front elevation of the portion of the motor shown in FIG. 1.
Figure 3:
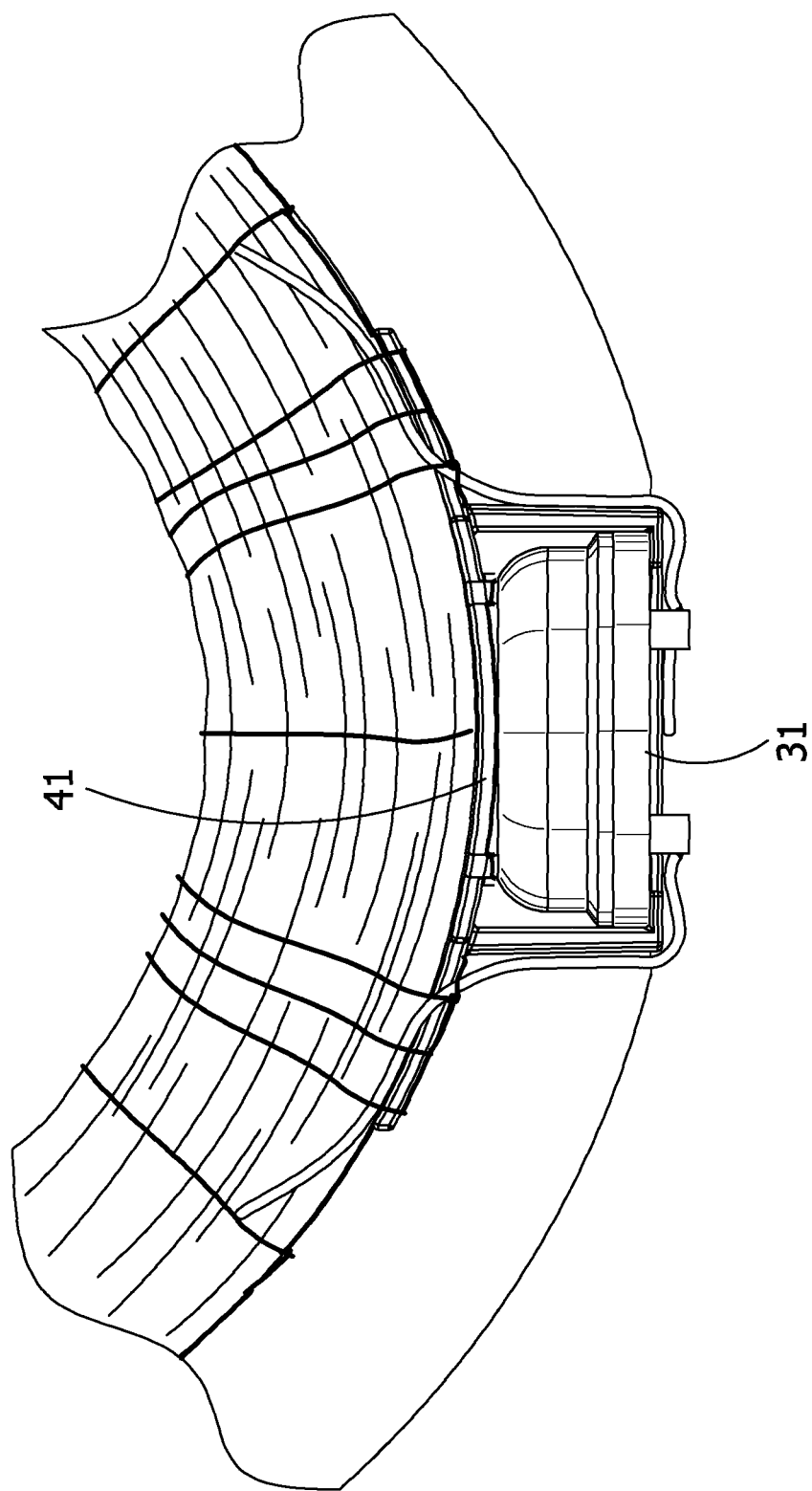
FIG. 3 is an enlarged top view of the motor.
Figure 4:
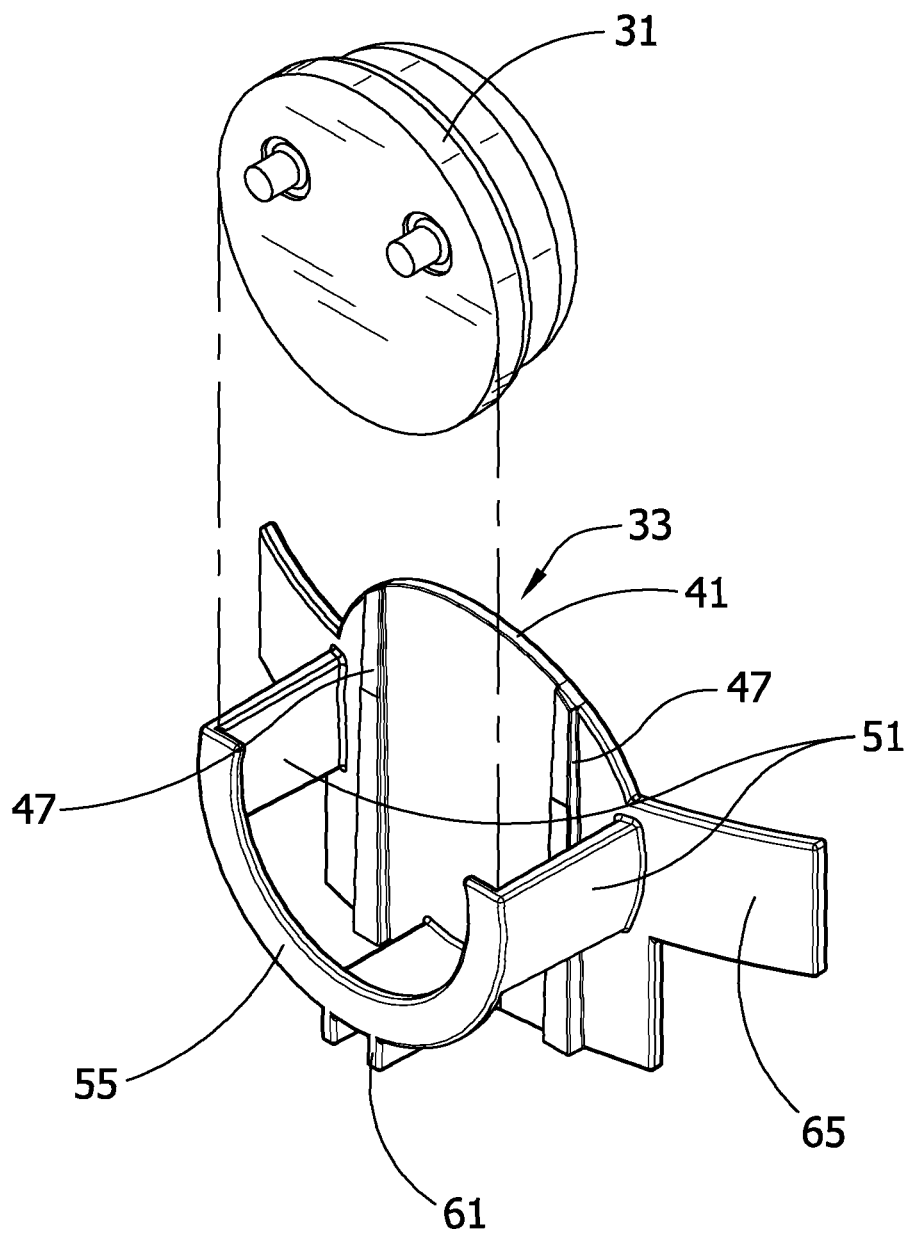
FIG. 4 is an exploded view of the bracket and protector, the wires of the protector being omitted.
Figure 5:
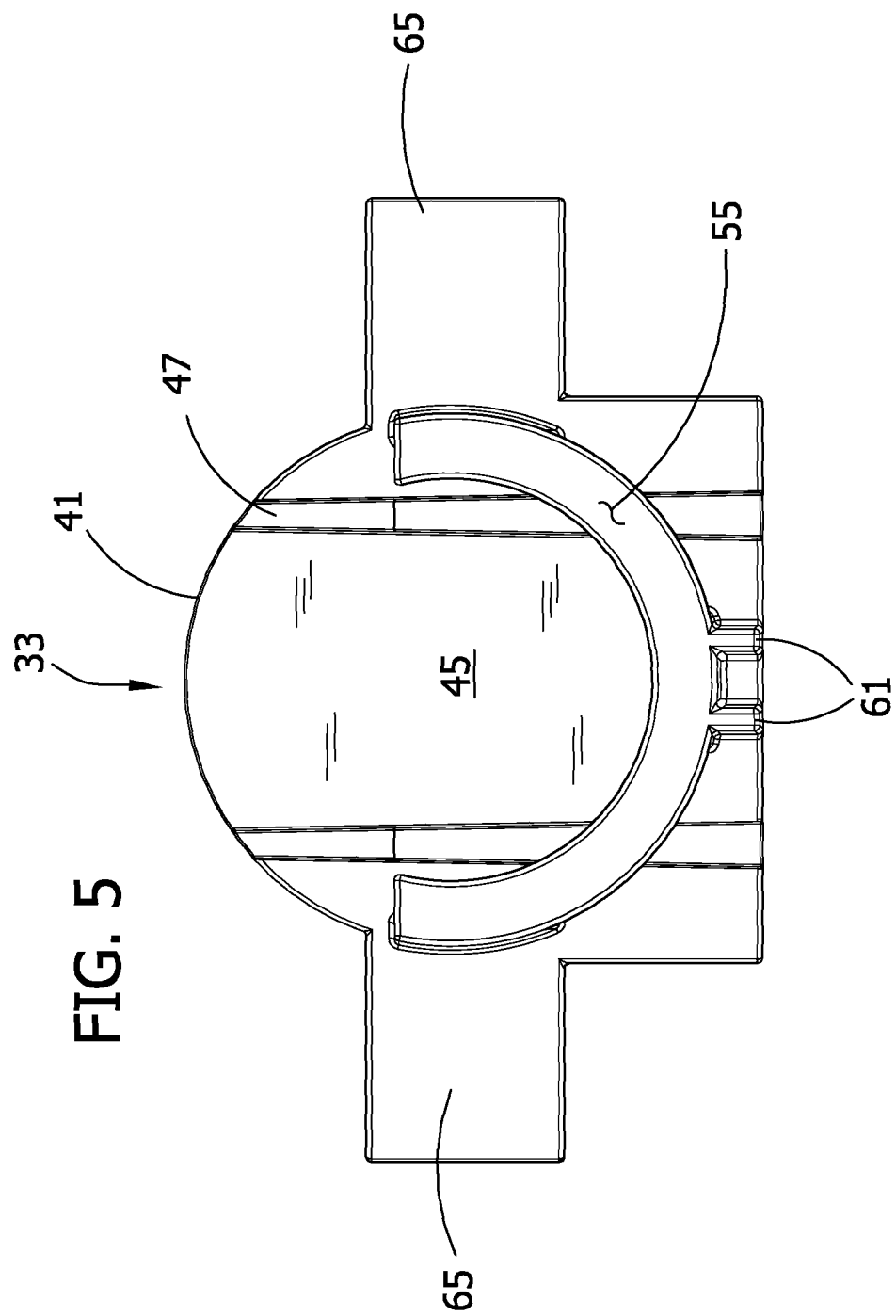
FIG. 5 is a front perspective of the bracket.
Figure 6:
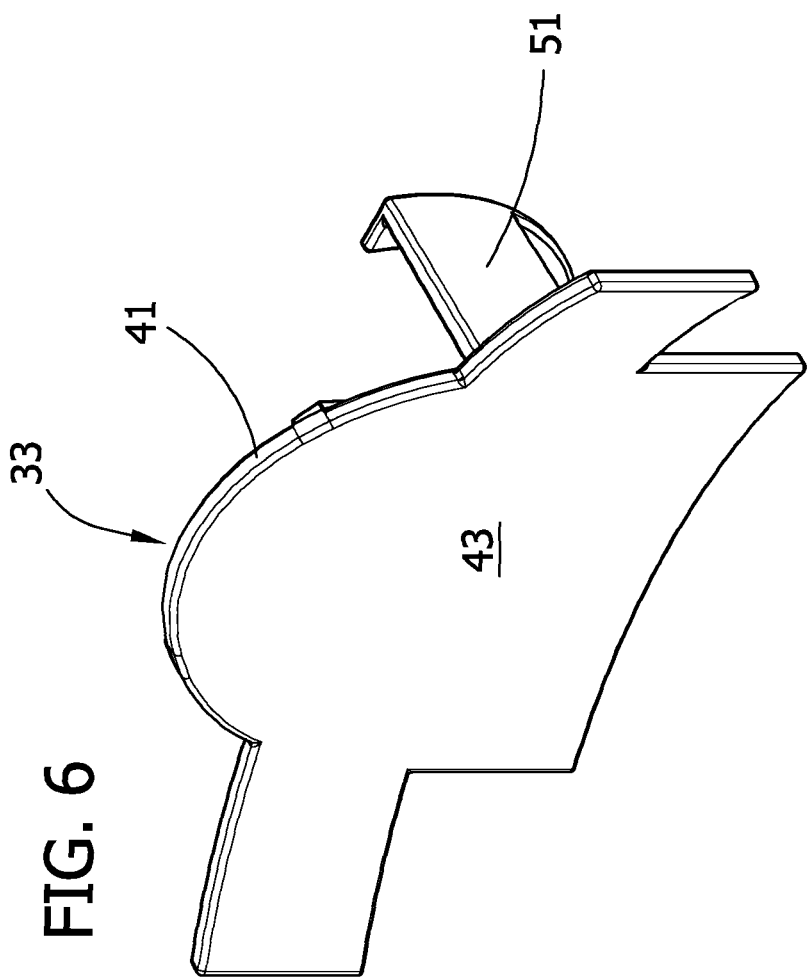
FIG. 6 is a rear perspective of the bracket.

As viewed in FIGS. 2 and 5, fingers 61 extend downwardly from one of the arms 51. The fingers 61 are disposed between the protector 31 and the stator core 14 to prevent the protector from contacting the stator core. The fingers 61 may also serve to locate the protector 31 relative to the core 14.

The bracket 33 may also include flaps 65 extending laterally from the spacer 41 to facilitate holding the bracket and protector 31 on the coil 23. For example, the lacing can extend over the flaps 65 to secure the bracket 33 and protector 31 on the coil 23. The flaps 65 may optionally include slots (not shown) to facilitate securing the bracket 33 on the coil 23.

The bracket 33 of this embodiment is an integral, single piece of electrically insulating, non-metallic material, e.g., a plastic material such as nylon. The bracket 33 may alternatively include multiple pieces. Note that in some embodiments, the material is chosen to withstand a corrosive or chemical-laden environment. The motor 11, may for example, be a hermetic compressor motor. The motor 11 may include chemicals therein that will contact the protector 31 and bracket 33, so that both are made to withstand contact with such chemicals.

In one embodiment, the protector 31 is of the type that senses current and temperature and is adapted to cut power to the motor 11 in response to excessive heat or a current abnormality. However, it is contemplated that the protector 31 only senses either temperature or current. The protector 31 of this embodiment is "in-line", and includes a bi-metal detector for sensing temperature and current.

The thickness of the spacer adds an additional variable or "knob" that an engineer can manipulate in a particular motor. In some more challenging compressor applications, it has been extremely difficult to create a cost-effective protector, or alternatively, a sensor/controller arrangement, that satisfies the disparate requirements for motor protection. For example, the protector must sufficiently protect against current abnormalities (e.g., in "locked rotor" mode) and against extreme temperatures (e.g., running mode). In these applications, it is difficult for the protector to satisfy both requirements. With this invention, the thickness of the spacer can be manipulated to make the protector less temperature sensitive, which can make the difference in satisfying disparate motor protection requirements. In other words, a protector that previously did not satisfy the requirements now does with an embodiment of this invention. Accordingly, embodiments of the invention can save time and money that would otherwise be spent on development of specialized protectors and/or alternatives such as separate sensors and controllers. It will be understood that compressor applications are merely one example where the invention can provide cost-effective benefits, and many other applications are contemplated.

When introducing elements of various aspects of the present invention or embodiments thereof, the articles "a", "an", "the" and "said" are intended to mean that there are one or more of the elements. The terms "comprising", "including" and "having" are intended to be inclusive and mean that there may be additional elements other than the listed elements. Moreover, the use of "top" and "bottom", "front" and "rear", "above" and "below" and variations of these and other terms of orientation is made for convenience, but does not require any particular orientation of the components.

As various changes could be made in the above constructions, methods and products without departing from the scope of the invention, it is intended that all matter contained in the above description or shown in the accompanying drawings shall be interpreted as illustrative and not in a limiting sense. Further, all dimensional information set forth herein is exemplary and is not intended to limit the scope of the invention unless stated otherwise.

What is claimed is:

1. A motor comprising a stator core, windings extending through the stator core, the windings forming a coil, a protector electrically connected to the windings, and a bracket mounting the protector on the coil, the bracket including: (i) a spacer adjacent the coil; (ii) an arcuate retainer spaced from the spacer; and (iii) a plurality of arms extending between the spacer and the arcuate retainer, wherein the protector is received in a pocket formed by the arms, retainer, and spacer and the protector is separated from the coil by the spacer to reduce heat transfer from the windings to the protector.

2. The motor of claim 1 wherein the spacer of the bracket has a thickness of between about 0.070 and about 0.200 inches.

3. The motor of claim 2 wherein the bracket is a single piece of electrically insulating material.

4. The motor of claim 3 wherein the bracket is made of a plastic material.

5. The motor of claim 1 wherein the arms are spaced from one another and define openings between the arms into the pocket to promote cooling of the protector, the openings extending all the way to the spacer.

6. The motor of claim 1 wherein the bracket has first, second and third arms, the first and second arms being disposed on opposite sides of the bracket, the third arm being disposed between the protector and the stator core.

7. The motor of claim 1 wherein one of the arms is disposed between the protector and the stator core to prevent the protector from contacting the stator core, the arm being in contact with the stator core.

8. The motor of claim 7 wherein the bracket includes flaps extending from the spacer to facilitate holding the bracket and protector on the coil.

9. The motor of claim 1 wherein the protector is operable to sense temperature and current and is adapted to stop the motor in case of either excess temperature or a current abnormality.

10. The motor of claim 1 wherein the protector is mounted on a side of the coil.

11. A motor comprising a stator core, windings extending through the stator core, the windings forming a coil, a protector electrically connected to the windings, and a bracket including a pocket for receiving the protector and a spacer adjacent the coil, the protector being separated from the coil by the spacer when the protector is received in the pocket, wherein the pocket is configured to permit the protector to be moved along a surface of the spacer into the pocket, and wherein said surface is adjacent the protector and includes ribs to permit gas flow between the protector and the spacer.

12. The motor of claim 11 wherein a portion of the pocket is tapered to facilitate securing the protector in the pocket.

13. The motor of claim 11 wherein the pocket is formed in part by a flange extending along an arc of more than 180 degrees.

14. The motor of claim 11 wherein the coil has a curved surface and the bracket is shaped to correspond with the curved surface of the coil.

15. The motor of claim 1 wherein the arcuate retainer extends along an arc of more than 180 degrees.

16. A motor comprising a stator core, windings extending through the stator core and forming a coil, a protector electrically connected to the windings, and a bracket mounting the protector on the coil, the bracket comprising a spacer and a pocket operable to hold the protector so the spacer is positioned between the protector and the coil, wherein the coil has a curved surface and the bracket is shaped to correspond with the curved surface of the coil.

17. The motor of claim 16 wherein the bracket further comprises arms extending from the spacer and the pocket is defined in part by the arms, the arms being spaced from one another to define openings into the pocket, said openings extending all the way to the spacer.

18. The motor of claim 16 wherein the pocket is configured to permit the protector to be moved along a surface of the spacer into the pocket.

19. The motor of claim 18 wherein a portion of the pocket is tapered to facilitate securing the protector in the pocket.

* * * * *